(12) United States Patent
Calado Da Silva et al.

(10) Patent No.: US 8,557,215 B2
(45) Date of Patent: Oct. 15, 2013

(54) NANOMETRIC-SIZED CERAMIC MATERIALS, PROCESS FOR THEIR SYNTHESIS AND USES THEREOF

(75) Inventors: João Manuel Calado Da Silva, Aljustrel (PT); Elsa Marisa Dos Santos Antunes, Aljustrel (PT)

(73) Assignee: Innovnano—Materiais Avançados, S.A., Aljustrel (PT)

( * ) Notice: Subject to any disclaimer, the term of this patent is extended or adjusted under 35 U.S.C. 154(b) by 216 days.

(21) Appl. No.: 12/994,430

(22) PCT Filed: May 26, 2009

(86) PCT No.: PCT/IB2009/052205
§ 371 (c)(1),
(2), (4) Date: Nov. 23, 2010

(87) PCT Pub. No.: WO2009/144665
PCT Pub. Date: Dec. 3, 2009

(65) Prior Publication Data
US 2011/0129670 A1    Jun. 2, 2011

(30) Foreign Application Priority Data

May 27, 2008   (PT) .......................................... 104085

(51) Int. Cl.
*C01B 13/00* (2006.01)
(52) U.S. Cl.
USPC ........................................ 423/593.1; 977/776
(58) Field of Classification Search
USPC ........................................ 423/593.1; 977/773
See application file for complete search history.

(56) References Cited

U.S. PATENT DOCUMENTS 5,855,827 A    1/1999   Bussing et al.

FOREIGN PATENT DOCUMENTS

| EP | 1 577 265 A1 | 9/2005 |
|---|---|---|
| WO | 2008/043790 A2 | 4/2008 |
| WO | 2009/040770 A2 | 4/2009 |

OTHER PUBLICATIONS

AZOM. "Alumina—Aluminum Oxide". Online at http://www.azom.com/article.aspx?ArticleID=52 added on Feb. 6, 2001. Accessed Feb. 16, 2012.*
Ivory Chemical. Carbamide (Urea46) Datasheet. Onlien at http://www.ivorychem.com/products/UREA46.pdf added 2004. Accessed Feb. 16, 2012.*
R.Y. Li, X.J. Li, and X.H. Xie; "Explosive Synthesis of Ultrafine Al2O3 and Effect of Temperature of Explosion"; Combustion, Explosion, and Shock Waves; vol. 42, No. 5, 2006; p. 607-610; XP002577584.
International Search Report dated Apr. 29, 2010.

* cited by examiner

*Primary Examiner* — Stanley Silverman
*Assistant Examiner* — Richard M Rump
(74) *Attorney, Agent, or Firm* — Kenealy Vaidya LLP

(57) ABSTRACT

The disclosed subject concerns nanometric-sized ceramic materials in the form of multiple crystalline structures, composites, or solid solutions, the process for their synthesis, and uses thereof. These materials are mainly obtained by detonation of two water-in-oil (W/O) emulsions, one of which is prepared with precursors in order to present a detonation regime with temperature lower than 2000° C., and they present a high chemical and crystalline phase homogeneity, individually for each particle, as well as a set of complementary properties adjustable according to the final applications, such as a homogeneous distribution of the primary particles, very high chemical purity level, crystallite size below 50 nm, surface areas by mass unit between 25 and 500 m2/g, and true particle densities higher than 98% of the theoretical density. This set of characteristics makes this materials particularly suitable for a vast range of applications in the nanotechnology field, such as, for example, nanocoatings, magnetic nanofluids, nanocatalysts, nanosensors, nanopigments, nanoadditives, ultra light nanocomposites, drug release nanoparticles, nanomarkers, nanometric films, etc.

16 Claims, No Drawings

NANOMETRIC-SIZED CERAMIC MATERIALS, PROCESS FOR THEIR SYNTHESIS AND USES THEREOF

TECHNICAL FIELD OF THE INVENTION

The present invention concerns nanometric-sized ceramic materials in the form of multiple crystalline structures, composites, or solid solutions, the process for their synthesis, and applications in the nanotechnology field, namely as nanocoatings, magnetic nanofluids, nanocatalysts, biological nanosensors, nanopigments for several industries, nanoadditives for fuels, photocatalytic effect in air and water purification, ultra light nanocomposites, nanoparticles for drug controlled release in the human body, nanomarkers, nanometric films.

BACKGROUND OF THE INVENTION

Nanomaterials with size lower than 100 nm are the base building blocks of a new discipline that has emerged in the last few years—nanotechnology. In effect, presently there is a huge interest all over the world in the very small, from scientific fields to politics itself, and nanotechnology is even often present in the speeches of the main world leaders.

It is presented as having the potential to become a technological discontinuity with implications in citizens' life, such as occurred in the past with the discoveries of the steam engine, the train, the automobile, the computer, and biotechnology.

All this excitement stems from the fact that nanometric-sized particles or structures of a certain material present a set of electrical, optical, magnetic, and mechanical properties that are different from that same material of larger size, namely: high plasticity, superhardness, lower melting point, transparency, high surface area by mass unit with consequential improvement of catalytic activity, low thermal conductivity, increased magnetic effect, high semiconductor luminescence, changes of color, and even obeying the laws of quantum mechanics, leading some scientists to propose that one might stand on the verge of a new state of matter.

In order to take advantage of the opportunities created by this set of novel properties and translate them into practical applications, in addition to the most common binary structures (with two elements) such as $Al_2O_3$, Zno, $TiO_2$, $ZrO_2$, ceramic nanomaterials usually require:

Oxides formed by combinations of multiple elements in several ternary ($ZnFe_2O_4$) or higher (LaSrCuO) crystalline structures;

Non-oxides with covalent/metallic binding crystalline structures of the Nitride type: AlON, ALN, SiAlON, etc.;

Composites, they result from the combination of two or more materials (Alumina/Zirconia) in a single particle, maintaining the individual crystalline structures of each Alumina and Zirconia.

Solid solutions, in this case, unlike the previous one, one of the components is "dissolved" in the other so that only a single continuous crystalline structure (different from the initial ones) is detectable, MgO—NiO and Alumina/Chromia (with innumerous applications in the optical fibers field) are two examples of this type.

Conceptually, ceramic composites result from the combination of two or more nanometric materials, and as such they present a combination of mechanical, thermal, electrical, magnetic, and optical properties that a single product could not exhibit.

A common example is the alumina/zirconia composite. Alumina is a material with a vast range of applications due to its high elastic modulus, high wear and etching resistance, and stability at high temperatures. It has, however, some weak points, namely low fracture toughness and flexural strength. When combined with zirconia to form a nanocomposite, it acquires a toughness level that makes it suitable for applications in biomaterials, optical devices, and extremely demanding operational conditions.

Likewise, a zirconia electrode used in hydrogen production from water decomposition requires a combination of ionic and electronic conduction, being then necessary to prepare a nanocomposite together with Ceria and Yttria, $ZrO_2$—$CeO_2$—$Y_2O_3$.

In turn, one of the multiple technological challenges in the area of combining several elements in different crystalline structures is designing and obtaining the zinc aluminate ($ZnAl_2O_4$) nanometric spinel, which possesses properties of high tear strength at high temperatures, with applications in aerospace industry.

A group of different nanometric crystalline structures, namely the ternary ones of the type $AB_2X_4$, $A_2BX_4$, $ABX_4$, and $ABX_3$, wherein A and B represent cations and X represents an anion, is particularly important for a vast set of special applications, from superconductivity ($LiTiO_3$) to energy storage ($LiMn_2O_4$) to paramagnetic properties exhibited by the spinel type structure—arising from the presence of unpaired electrons in some electronic levels.

An example of a covalent/metallic binding non-oxide is nanometric ALN, exhibiting a high thermal conductivity which makes it an excellent alternative to alumina in advanced electronic circuits where an excess heat is produced due to the high concentration of circuits, rising the temperature and limiting the speed of applications. Nanometric AlN can dissipate this heat by an extremely fast conduction that maintains the temperature stable.

In the four types of examples listed above, in addition to their physical properties that are usually important for the characterization of nanomaterials in general, namely the primary particle size, size distribution, particle morphology, chemical purity level, surface area by volume unit, surface characteristics, and crystallite size, the oxides of ternary and higher structures, the covalent/metallic binding non-oxides, the composites, and the solid solutions further present, as opposed to the simple and binary structures, critical requirements of chemical and crystalline phase homogeneity at the individual level of each particle which are extremely difficult to obtain, because it is necessary to combine several different elements during the synthesis, in addition to the difficulty of attaining and maintaining the nanometric size of the primary particles.

These requirements are only ensured if a fast and complete reaction without concentration or temperature gradients during the synthesis of the nanoparticles is available, whether we are dealing with materials with multiple crystalline structures, composites, or solid solutions.

In addition to these two aspects, having reproducible and continuous methods, not only on a laboratory scale, allowing the production of large amounts of ceramic materials of all types of nanometric-sized structures previously mentioned is a further obstacle.

The existing methods for the production of composites, solid solutions, or different ternary (among which the spinel type) and higher nanometric-sized crystalline structures are similar. In fact, obtaining a composite or a crystalline structure depends only on the ratio of the elements, the temperature and pressure of the synthesis, and the phase equilibrium diagram thereof. Thus, for example, zirconia and titania in a 1:2 ratio between 700 and 1200° C. form a structure $ZrTi_2O_6$. But in a 5:7 ratio between 1100 and 1800° C., however, the compound with the ternary structure $ZrTiO_4$ is formed.

The known and mentioned methods are divided in three categories: solid, liquid, and gas, according to the phase in which the synthesis reaction occurs.

1. Solid Phase Methods

In this method, the final compound/composite is usually prepared from a solid state reaction between the different elements, followed by an intensive milling process until a size of about 200 nm is obtained. The main limitations of this low cost method, besides the difficulty in attaining sizes lower than 0.2 microns, are related with the presence of impurities, a non-uniform distribution of particle size, and essentially a defective homogeneity level of composites and compounds, arising from the incomplete diffusion reactions between the reagents.

2—Liquid Phase Methods

There is a set of recent methods in the liquid phase which share the fact of starting with a solution in which the initial elements are stequiometrically dissolved at the molecular level. By means of different techniques, such as for example, coprecipitation, sprinkling, or sol-gel, a precipitate in the form of hydroxide is formed. All these methods have, as weak points, the different solubilities of the various hydroxides with the pH—implying that the ratio of cations in the final hydroxide does not match the ratio in the starting solution—, low production yields, and the requirement of subsequent steps, such as for example, calcination, for conversion to the oxide, and milling.

In combustion synthesis, a stequiometric amount of nitrates is dissolved in the minimum amount of water required and then an amount of fuel is added. This mixture undergoes heating at a temperature that can range between 200 and 500° C., and some minutes after the ignition a compound is obtained. The weakest point of the method, in addition to the operational discontinuity, is the high internal porosity of the particles, which is highly disadvantageous when conducting a subsequent sintering stage.

3. Gas Phase Methods 3.1. Low Pressure

It is presently being developed a set of alternative low pressure, gas phase methods, such as for example, the aerosol or pyrolysis synthesis, based in the production of a gas suspension that results in extremely fine particles by condensation. The main weak point of this route is the very low production capacity and the difficulty in obtaining complex (ternary) structures and composites.

In turn, the method proposed by the present invention, that is, detonation of a water/oil (W/O) emulsion, may be included in a new category (high pressure) of the gas phase reaction. The high pressure gas phase reaction has several advantages comparatively to the low pressure method, namely the fact that it allows combining and obtaining a large set of materials with different crystalline structures and nanometric composites in a single stage, in large amounts, and with high phase homogeneity, from the high pressure reaction of the various elements in the gas phase.

The production of nanomaterials by this method comprises four stages:

a) Preparation of the base (W/O) emulsion:

The formulation flexibility of the emulsion allows including in its composition a large set of precursors, from metals, metal alloys to different metal salts, which constitute the precursors that will transform into a all range of crystalline structures and composites;

b) Detonation reaction of the (W/O) emulsion with formation of a gaseous plasma:

The extremely fast detonation reaction rates (in the order of microseconds) generate high pressures which ensure a complete transformation degree of the precursors into a gas plasma that already contains the required materials/composites;

c) Condensation to form nanoparticles:

In order that the condensation phenomenon of the materials and composites occurs and results in the production of a large amount of nanometric-sized particles, the gaseous plasma has to achieve high pressures in a high supersaturation state. The size of the first condensates will decrease with increasing supersaturation degree, as measured from the relation between the reaction pressure and atmospheric pressure (P/PO). The pressure levels generated by the detonation of the emulsion ensure maximization of the (P/PO) relation and consequential production of nanometric-sized particles;

d) Control and preservation of the nanometric size of the particles:

After the formation of the first particles, the nanometric state will be rapidly destroyed by the beginning of the coagulation/coalescence phenomenon among particles, being therefore indispensable a fast cooling rate as soon as they are formed, or their dispersion in a high speed gas flow, for controlling the process.

The method of synthesis for nanometric-sized ceramic materials proposed by the present invention ensures a fast cooling rate and dispersion in a high speed gas flow through the ability to regulate the detonation temperature and the residence time of the particles in the higher temperature zones of the reactor.

In summary, the method proposed by the present invention combines a set of requirements which allow obtaining nanometric-sized ceramic materials with multiple crystalline structures, such as:

Oxides with binary, ternary, or higher crystalline structures

Non-oxides with crystalline structures of the nitride type

Composites

Solid solutions which, in addition to the high chemical and phase homogeneity level, exhibit a group of complementary properties adjustable according to the final applications, such as: uniform distribution of the primary particles between 15 and 100 nm, chemical purity level higher than 99.99%, surface areas by mass unit between 5 and 500 m2/g, and crystallite size below 50 nm, and real particle densities higher than 98% of the theoretical density.

The use of the (W/O) emulsion concept for the production of nanoparticles is referred to in the document by Takoa Tami, Kazumasa Takatari, Naoysashi Watanabe, and Nabuo Kaniya, Metal Oxide powder synthesis by the Emulsion Combustion Method, Journal of Materials Research (1997). This document presents a new method for the synthesis of nanometric alumina powders *"Emulsion Combustion Method"* (ECM) from the combustion of a (W/O) emulsion with atmospheric air, affording hollow alumina particles. The method of the present invention, however, uses a different regime, i.e., it uses detonation instead of combustion, and does not make use of external air.

On the other hand, the use of the detonation process for explosives in the synthesis of materials with special properties started about thirty years ago, and since then has been focused on the production of nanodiamonds (a special structure of carbon), as an example the one referred to in the document by Fenglei H. Yi T., Shouurong Y., Synthesis mechanism and technology of ultrafine diamond from detonation, which discloses the use of carbon-rich military explosives for the production of nanodiamonds by means of detonation. The present invention is different from the subject-matter taught in this document in that it uses two (W/O) emulsions, one of them containing multiple precursors presenting a detonation regime at a temperature lower than 2000° C., to afford ceramic composites and a multiplicity of crystalline structures, whereas in this document use is made of military explosives distinct from the (W/O) emulsions, with a detonation temperature higher than 3500° C.

More recently, the detonation method is referred to in a set of other documents and publications, namely:

U.S. Pat. No. 5,855,827 describes a cyclic detonation process for the production of ceramic coatings on different substrates or production of micrometric and nanometric powders. The detonation takes place in a gas mixture containing a metal suspension of extremely thin granulometry. The process of the present invention distinguishes from the latter in that it uses two (W/O) emulsions in the liquid or solid phase, thereby allowing a better control of the conditions for the synthesis of nanomaterials and providing ceramic composites and various (ternary or higher) crystalline structures.

EP 1577265 discloses an industrial process for the production of fine (micrometric) alumina (Al2O3) powder from a cyclic detonation process of granulated aluminium mixed with an oxidizing agent. The present invention distinguishes from the latter in that it incorporates several types of metallic precursors, such as for example, nitrates, sulphates, acetates, in a (W/O) emulsion that exhibits a detonation regime at a temperature lower than 2000° C., providing nanometric instead of micrometric-sized particles that allow obtaining composites and multiple (binary, ternary, and of the nitride type) crystalline structures.

The document by Chiganova, G. A, Detonation synthesis of ultrafine alumina, Inorganic Materials, MAIK Nauka/Interperiodica ISSN 0020-1685 (Printed) 1608-3172 (Online) Vol. 41 N° 5, May 2005, pp. 468-475, discloses the use of the explosion energy to accelerate and oxidize aluminium in very thin foils inside a chamber with oxygen, obtaining nanometric alumina. In the present invention, the detonation reaction of the different precursors, such as metals, alloys, nitrates, sulphates, or alike, takes place within the composition of one of the (W/O) emulsions, whereas in this document the aluminium reaction occurs later in a gas chamber, obtaining alumina with transition (non-stable) crystalline phases and some unreacted aluminium.

The document by R. Y Li, X. J. Li, and X. H. Xie, Explosive synthesis of ultrafine Al2O3 and effect temperature of explosion, Combustion, Explosion and Shock Waves, Vol. 42, N° 5, pp. 607-610, 2006, teaches the production of nanometric Al2O3 in several metastable phases from the decomposition of Al(NO3)3 mixed in a military explosive, RDX, during detonation. The final product alumina exhibits several contaminations. The method presented in the present invention is different in that it uses two (W/O) emulsions, one of them containing multiple precursors that are an integral part of its composition (at the molecular level), which allow obtaining a group of non-binary, such as ternary, higher, and non-oxide structures with high purity level.

PT 103838, Nanocrystalline spherical ceramic oxides, process for the synthesis and uses thereof ("Óxidos cerâmicos esféricos nanocristalinos, processo para a síntese e respectivas utilizações"), discloses a process for the synthesis of polycrystalline, spherical, micrometric particles (less than 40 microns) composed by nanometric crystals for applications in ceramics industry. The process for the preparation and detonation of the (W/O) emulsion of the present invention distinguishes from the latter in that: a) it uses two W/O emulsions, one of them exhibiting detonation temperatures lower than 2000° C. that allow obtaining nanometric-sized particles, unlike the process of the cited document which affords only micrometric-sized particles because it is conducted at temperatures higher than 2000° C.; b) it uses simultaneously several metallic precursors that allow obtaining oxides with tertiary and higher structures, composites, and solid solutions, whereas the method disclosed in PT 103838 allows the synthesis only of oxides with binary structures (two elements) oxides because it uses a single precursor per composition; c) it uses fuels soluble in the aqueous solution (internal phase) allowing the formation of non-oxide compounds, such as nitrides, carbides, and hydrides, that were not obtainable by the process described in said document.

In this way, the process of the present invention enables the synthesis of nanometric-sized ceramic materials with different covalent/metallic binding crystalline structures, homogeneous distribution of the primary particles, high chemical purity level, crystallite size below 50 nm, and real particle densities higher than 98% of the theoretical density.

The document by X. J. Li, X. OUYANG, H. H YAN, G. L SUN, and F. MO, Detonation synthesis of TiO2 nanoparticles in gas phase, Advanced Materials Research Vol. 32 (2008) pp. 13-16 (online), discloses the synthesis of TiO2 nanopowders from the detonation of a gas mixture of hydrogen, oxygen, and titanium chloride. Unlike the present invention, however, this method is limited to room temperature-gaseous precursors, whereas the method of the present invention uses a liquid state (W/O) emulsion and allows the use of a multiplicity of liquid and solid precursors as part of that emulsion.

GENERAL DESCRIPTION OF THE INVENTION

The present invention refers to nanometric-sized ceramic materials with multiple crystalline structures and in the form of composites or solid solutions, to the process for their preparation, to characteristics and properties thereof, and to nanotechnology applications.

1. Process for the Preparation of Nanometric-sized Ceramic Materials

The process for the synthesis of nanometric-sized ceramic materials with different crystalline structures, in the form of composites and solid solutions, according to the present invention consists mainly in selecting a starting composition of precursors, according to the empirical formula and temperature in the phase equilibrium diagram for the final ceramic product desired, preparing said composition in the form of a (W/O) emulsion, detonating said (W/O) emulsion together with a different initiator (W/O) emulsion in a stable detonation regime at a sufficiently low temperature (lower than 2000° C.), followed by an extremely fast cooling, thereby obtaining particles with particle size below 100 nm.

The base or initiator emulsion referred to in the present invention is of the (W/O) type, broadly used, for example, in the manufacture of explosive emulsions, being composed by two intimately linked phases under the action of a surfactant: internal (aqueous) phase and external (insoluble) phase.

The second (W/O) emulsion has the ability (unlike other explosives in general) to emulsify compositions with extremely low pH values (below 5) by selecting surfactants suitable for these acidity levels that result from the dissolution of a set of precursors, such as nitrates, sulphates, chlorides, soluble in the aqueous phase of this (W/O) emulsion, and is found to be vital, by ensuring a starting molecular homogeneity of the precursors, for obtaining a high phase homogeneity of the final ceramic products, subject of the present invention, that is required for the applications of these nanomaterials.

According to the present invention, non-ionic compounds for low pH-values below 3.5, and polyisobutylene derivatives for pH-values higher than 3.5 can be used as surfactants.

The types of precursors considered in the scope of the present invention are:
- Oxidizing agents soluble in the internal aqueous phase, such as nitrates, sulphates, chlorides;
- Fuels soluble in the internal aqueous phase, such as hydrazine, urea;
- Fuels miscible with the external phase, such as hydrocarbons, organic materials.

In addition to these components, the second W/O emulsion still comprises solid precursors, like metals and metal alloys, that form a homogeneous gaseous plasma through gasification during the detonation reaction stage.

This set of precursors which constitute the components of the second (W/O) emulsion will transform into a range of desired crystalline structures and nanometric composites during the detonation reaction.

In the process of combination of the different precursors, the critical point is for the emulsion to maintain a detonation regime at sufficiently low temperatures (below 2000° C.), thereby maintaining the primary particles in the nanometric state.

The possibility of using metals or alloys together with the remaining precursors already mentioned has two extremely important implications:
a) Productivity—high conversion rate onto the final product by unit of the initial composition;
b) Purity level—requisite for multiple nanotechnology applications, namely in the fields of biomaterials and medicine.

Metals are easier to purify than other precursors in general due to their low melting points.

The process for the synthesis of nanometric ceramic materials with multiple crystalline structures, in the form of composites or solid solutions, is therefore essentially comprised by the following steps:

1.1. Defining the Stequiometry of the Reagents in the Second W/O Emulsion

The components of the second (W/O) emulsion are selected from the already mentioned set of precursors (soluble oxidizing agents, soluble fuels, immiscible fuels, metals, and metal alloys), and their relative ratio depends on the empirical formula and the type of structure of the desired ceramic material.

1.1.1. Empirical Formula

If one wishes to synthesize the spinel of empirical formula $NiFe_2O_4$, the starting composition should comprise Ni and Fe exactly in the same molar ratio (1:2) as the final compound ($NiFe_2O_4$), in addition to enough oxygen to complete the oxidation reaction.

1.1.2. Type of Structure

The choice of the precursors depends on the type of structure, mainly the family type to which the ceramic compound belongs, thus:
a) Oxides with binary, ternary, or higher structure:
  Precursors—soluble, oxygen-rich oxidizing agents with or without metals or metal alloys.
b) Non-oxide with covalent/metallic binding crystalline structures, of the nitride type (AlON, AlN, SiAlON, etc.):
  Precursors—composition of the internal phase 100% or largely constituted by oxygen-free soluble fuels, such as for example, hydrazine.
c) For composites and solid solutions the rule is similar, whether they are oxides or non-oxides.

1.2. Adjusting the Mixture Detonation Temperature

The detonation temperature has a key role in all this process for two reasons:
a) Obtaining primary particles in the nanometric state, being necessary that the detonation temperature of emulsion 2 at the point C,J (Chapman/Jouguet) is lower than the melting point of the desired ceramic material in order to reduce the coalescence time, thereby maintaining the primary particles in the nanometric state. In practice it means that it is necessary to operate at temperatures lower than 2000° C., which is the limit for most melting points of ceramic materials (oxides, carbides, nitrides, and hydrides).
b) Attaining with great accuracy the required point of the phase equilibrium diagram corresponding to the formation of said ceramic compound. By finely adjusting the temperature of the detonation gases through regulation of formulation parameters, such as amount of endothermic elements in the starting solution, type of fuel, and the relation internal phase/external phase of the emulsion, it is possible to obtain the required crystalline structure without the need of any subsequent thermal treatment and without changing the stequiometric ratio established for the reagents in point 1.1.

Considering the experimental difficulties of measurement, the detonation temperature at point (C,J) is determined from the composition and initial density of the emulsion making use of computational programs (BKW, Tiger, THOR) which use state equations and numerical methods. When this stage is completed, the final composition of the second (W/O) emulsion is established.

1.3. Preparing the Second (W/O) Emulsion

After establishing the final composition in the previous stages 1.1 and 1.2, one proceeds to the stage of obtaining the second (W/O) emulsion, mainly composed by two intimately linked phases under the action of a surfactant: internal (aqueous) phase and external (insoluble) phase, the external phase being usually comprised between 2 and 20% of the total composition in order to provide an oxygen balance near zero.

1.3.1. Preparation of the Internal Phase

Dissolution of the precursors in water according to the composition of emulsion 2 previously selected.

This phase is heated at a temperature (35-105° C.) higher than the crystallization point of the different reagents in order to allow their complete dissolution. The dissolution of nitrates, chlorides, and sulphates usually gives rise to very low (0-4) pH values, thus being necessary to use stainless steel containers. The amount of water should be comprised between 5-60% of the total composition. According to the desired detonation temperature, water is a strongly endothermic element and strikingly decreases the detonation temperature.

1.3.2. Preparation of the external phase by mixing the hydrocarbons or organic materials thereof with a surfactant (of the type previously mentioned) suitable and special for the low pH values, soft heating between 35-85° C., in order to ensure the appropriate mixture viscosity and a temperature close to the internal phase.

The surfactant should correspond to 1 to 2% weight of the whole composition in order to ensure the stability of the (W/O) emulsion.

1.3.3. Emulsification of both phases into an emulsified matrix and subsequent refining at about 60-150 psi, to afford a stable emulsion wherein the micelle size is comprised between 1 and 10 microns, since above this limit the emulsion progressively disintegrates, loosing sensitivity and stability.

1.3.4. Addition of an organic sensitizer (0.2 to 2%), such as expanded polystyrene or contaminant-free plastic spheres, that is consumed in the detonation reaction and whose function is to adjust the density to a value below 1.25 g/cm3, in order to ensure the sensitivity level that allows attaining a detonation rate higher than 4000 m/s.

1.3.5. According to the composition predefined in point 1.1, addition or not of solid state metals or metal alloys with subsequent homogenization. The metals or metal alloys are two possible examples of externally added precursors, but with high homogeneity.

1.4. Preparation of the Configuration/geometry of (W/O) Emulsion 2

According to the rheology thereof, the (W/O) emulsion allows the relatively easy preparation of different geometrical configurations: spherical, cylindrical, annular, or with plane faces, which control the cooling rate of the particles, contributing not only to obtaining nanometric-sized ceramic materials but also to control their crystallinity level or amorphous state. The faster the cooling rate the higher the surface areas by mass unit. In the case of gas cooling in water (instead of air) one can achieve surface areas higher than 300 m2/g. This parameter is especially relevant for nanotechnology applications requiring a catalytic effect.

Due to the huge contact area between the internal and external phases and the possibility to easily regulate the number of initiation points by volume unit through the amount of sensitizer used, the (W/O) emulsion has very low critical detonation diameters (minimum diameter at which the detonation is still stable) of about 15-20 mm for a cylindrical geometry, or 5-10 mm for plane, sandwich type, or annular geometry. This feature allows using small thicknesses, meaning low temperature and particle concentration gradients, both during the detonation reaction phase and in the radial gas expansion and nanoparticle formation phase, and is the major responsible for the homogeneity of the primary particles of the ceramic materials both at the morphology and size distribution levels.

1.5 Detonation of the (W/O) Emulsion 2

Whatever the configuration adopted in 1.4, it is necessary to ensure an identical detonation regime for the whole composition of emulsion 2 prepared in the stages 1.1 to 1.5. For that purpose, the steps of initiating the detonation with a detonator or other system with similar effects, such as capacitive discharge, laser, etc., and stabilizing the detonation front must occur previously in another W/O emulsion (base or initiator emulsion), solely based on ammonium nitrate and water in the internal phase and mineral oil and emulsifying agent in the external phase, in order to produce no solid contaminants but only gas reaction products, such as $CO_2$, $H_2O$ and $N_2$.

This initiator emulsion (emulsion 1) has the following composition:
Ammonium nitrate (80-90%)
Water (10-15%)
Mineral Oil (3-10%)
Emulsifying Agent (0.5-1.5%)
and a density between 1.15 and 1.39 g/cm3, adjusted with the amount of sensitizer.

This emulsion (1) is coupled to the emulsion containing the precursors (emulsion 2), thereby allowing the latter to attain a rate that is stable and higher than 4000 m/s by regulating the density between 0.7 and 1.4 g/cm3.

The amount of initiator emulsion (emulsion 1) should be enough to ensure the stability of the detonation wave. Its length should be 5 times the diameter, for example, in a cylinder with 30 mm in diameter, the initiator emulsion should have a minimum length of 150 mm.

An identical regime (detonation rate) in the whole composition of emulsion 2 is intimately related with providing a reproducible form of the final nanoceramic product with high homogeneity of its final properties, such as for example, the type of crystalline phases, primary particle sizes, crystallite sizes, particle morphology.

1.6. Collecting and Treating the Reaction Products

Powders are dragged by the gases originating from the detonation reaction into an expansion chamber, where they are wet collected in order to avoid accumulating dusts in the air. Thereafter they are wet sieved, dried at a temperature always lower than 70° C., and finally deagglomerated and bagged. A small sample, about 100 g, is collected, and some chemical and physical analyses are conducted in order to characterize the synthesized product.

2. Characterization of the Nanometric-sized Ceramic Materials

Nanometric-sized ceramic materials produced according to the present invention exhibit a set of significant features, such as:

2.1. Multiplicity of Crystalline Structures, such as:
Oxides with combinations of various elements in several binary, such as for example, $Al_2O_3$, $ZrO_2$, $TiO_2$, $ZnO$, ternary, such as for example, $ZnFe_2O_4$, or higher, such as for example, LaSrCuO, crystalline structures;
Non-oxides with covalent/metallic binding crystalline structures, of the nitride type, such as for example, but not limited to AlON, ALN, SiAlON;
Composites resulting from the combination of two or more materials, for example, alumina/zirconia, in a single particle maintaining the individual crystalline structures of each alumina and zirconia.
Solid solutions, in this case, unlike the previous one, one of the components is "dissolved" in the other so that only a single continuous crystalline structure, different from the initial ones, is detectable, such as for example, MgO—NiO and $Al_2O_3/CR_2O_3$.

2.2. They present high chemical and crystalline phase homogeneity at the level of each particle, individually.
2.3. Primary particle size between 15 and 100 nm.
2.4. Homogeneous distribution of the primary particles.
2.5. Chemical purity level higher than 99.99%.
2.6. Crystallite size below 50 nm.
2.7. Surface areas by mass unit between 5 and 500 m2/g adjustable according to the application.
2.8. True particle density higher than 98% of the characteristic theoretical density of the compound.

A set of physical/chemical methods are used for characterizing the above mentioned properties:

X-Ray Diffraction

X-Ray diffraction allows the identification of the material, assessing its amorphous or crystalline state, its crystalline phases, and the crystallite size. After plotting the calibration curves for each material, by deconvoluting the overlapped peaks it is possible to quantify the percentage of each compound in a given material. The crystallite size is determined by means of the Scherrer equation and full width at half maximum values of the most intense peak in the X-Ray diffractogram. Notice that this value should always be corroborated with the values obtained by transmission electron microscopy.

Transmission Electron Microscopy—TEM

The determination of the crystallite size by transmission electron microscopy implies preparing a sample according to the following steps:

a) In an ultrasound bath, disperse the material into a chemically compatible solvent;
b) In the previous solution insert a special grid for TEM for some seconds, in order to retain an amount of particles sufficiently representative of the sample;
c) Let the material dry extensively, for about 12 hours, to avoid disturbances during the sample observation.

When observing the sample in normal mode, one can assess the particle morphology, the presence of any aggregates and the size thereof. Notice, however, that this analysis is only qualitative. For determining the crystallite size value it is necessary to use the "Dark Field" mode; the image will have a black background and the crystals will be highlighted in white. With the help of suitable software it is possible to determine the crystallite size very accurately.

Scanning Electron Microscopy—SEM

Preparing a sample for scanning electron microscope observation involves the following stages:
a) Put a small amount of powder over an adhesive carbon tape that is already mounted onto a support suitable for the microscope;
b) Cover the powder with a nanometric layer of carbon or gold, according to the product to be observed and the intended purposes.

Observation of the sample allows drawing conclusions about the particle morphology, texture, as well as the powder agglomeration state.

The great majority of SEM has an option named EDX (Elementary Analysis), which is very important to characterize and assess the homogeneity of composites. EDX performs an elementary X-Ray diffraction, that is to say, it determines only chemical elements in the selected zone of the sample, which can be part of a particle, a particle, or a set of particles. Thereby it is possible to establish the chemical composition of each particle and ascertain if this composition is similar for all particles, i.e., it allows to assess the homogeneity level of the observed sample. By combining the results obtained with the EDX technique and X-Ray Diffraction it is possible to draw safe conclusions regarding the compounds present in the composite and the homogeneity level thereof.

Particle Size Distribution

Particle size distribution is determined in a granulometric measuring device, starting with a suspension prepared according to the following steps:
a) Disperse a small amount of powder in a chemically compatible solvent that allows a higher degree of sample deagglomeration;
b) To the previous suspension add 1 mL of a dispersing agent chemically compatible with the suspension.

The plot obtained allows determining the distribution (monomodal, bimodal, etc.) type of said powder. Notice that if the sample dispersion is not done properly there is the risk of assessing the agglomerate size instead of the particle size.

Specific Surface Area—BET

Specific surface area is the area occupied by each particle or each aggregate by mass unit. This analysis is very important for nanoparticle characterization because it allows, when combined with other analyses, to correlate the particle size with the aggregation state, and also to detect the presence of internal porosity within the particles. This analysis is very often used for determining the particle size, since the establishment of the particle size by means of a granulometric measuring device requires suspensions that are stable during the measurement, which are harder and harder to obtain with decreasing particle size.

True Particle Density

Real particle density is determined by means of a helium pycnometer. When compared to the theoretical value, the density value obtained allows quantifying the internal porosity of the analysed sample.

Chemical Analysis—Purity Level

The quantification of the purity level/contaminants of a given material should always be performed by means of ICP-AES (Inductively Coupled Plasma-Atomic Emission Spectrometry), for it is a technique with very low detection limits and high accuracy. Samples must be present in an aqueous phase; in the case of a powder sample, it should be dissolved or digested by chemical or other methods according to the material to be analysed. With this analysis it is possible to quantify with high precision the chemical elements present in the sample, but it does not identify the compounds, being then always required to conduct X-Ray diffraction as a complementary procedure.

Notice that, in order to characterize a sample, several types of analyses should be conducted and the results should be assessed as a whole in order to draw more accurate conclusions.

The type of applications of these materials in the nanotechnology field depends mainly on the properties thereof mentioned in the previous point, namely:

Type of Structures

The fact that the detonation process of a (W/O) emulsion described in the present invention is so flexible that it allows obtaining nanometric ceramic materials with multiple different crystalline structures, such as binary structure oxides, oxides consisting in combinations of multiple elements in several ternary or higher crystalline structures, non-oxides with covalent/metallic binding crystalline structures, of the nitride type, composites, solid solutions, is extremely important, since it enables to consider a multiplicity of nanotechnology applications where this diverse set of structures is required, such as for example, translucent composites for the dental field, superconductivity, energy storage, magnetic nanofluids, energy dissipation during computation, high strength biomaterials for prostheses, etc.

Crystalline Phase Homogeneity

When a ceramic nanomaterial is designed in the form of a composite or solid solution, it is sought that it presents, by combining complementary properties of various materials, a combination of mechanical, thermal, electrical, magnetic, or optical properties at the level of each individual particle that a single product could not exhibit. The phase homogeneity presented by the nanomaterials of the present invention at the level of each individual particle, by means of the conditions ensured by the (W/O) emulsion detonation process (starting composition mixed at the molecular level and reaction conditions), makes them particularly suitable for a vast range of applications where the combination of properties of several ceramic materials is required.

One of the many examples where this homogeneity is critical is in the preparation of nanometric films for the semiconductor electronics industry. Powder nanocomposites are sintered in an extremely dense ceramic tablet (target tablet) which, when bombarded with an electron beam, starts depositing the atoms in a given substrate. If the composite is not formed and mixed at the molecular level in the original powders, the characteristics of the resultant film will not be homogeneous.

Primary Particle Size and Distribution

Primary nanometric particle size and distribution, besides having an effect on the surface area by volume unit, are responsible for a series of properties of nanomaterials, such as:
a) Optical properties—Change of colour, transparency, when the particle size gets lower than some of the light wavelengths, with applications in transparent films of TiO2, for example;
b) Physical properties—Decrease of melting point, allowing their use as sintering adjuvants in ceramics industry, considerable improvement of heat transfer capacity;
c) Magnetic properties—Increase of nanofluid coercivity;
d) Mechanical properties—Softer surface finishings.

Chemical Purity Level

The purity level of nanometric ceramic materials is particularly important in the biomedical fields, such as nanomedicine (a new branch connected with the detection and treatment of diseases such as cancer), where functionalized nanoparticles are used for detecting certain antibodies and adhering to the target diseased cells, and the latter can then be selectively destroyed by means of radiation or magnetic fields, and also in biomaterials used in the manufacture of prostheses.

In addition to this domain there is a set of electrical, magnetic, and optical applications where the presence of small impurity levels completely change the expected properties. The nanomaterials hereby obtained can be used in this highly demanding type of applications, for they can attain a purity level higher than 99.99% (by controlling the purity level of the starting precursors).

Surface Area by Mass Unit

This feature is undoubtedly one of the most important in the nanomaterial world, and is responsible for many of the novel properties. The higher the surface area the higher the ratio of surface atoms to the total atoms in the particle, and because solid state chemistry takes place at the surface, if this property is increased it means that the chemical reactivity will be higher and the reactions will be more effective. The ability of the present invention to provide crystalline or amorphous structures by regulating the particle cooling rate allows varying the surface areas between 5-500 m2/g, making these nanomaterials particularly suitable for applications where the catalytic effect is critical, such as for example:
a) Chemical synthesis—of methanol, of hydrogen (photocatalytic oxidation), catalytic conversion of exhaust gases of vehicles, oil refining, etc.;
b) Cosmetics—improved odour suppression;
c) Environment—improved absorption capacity of toxic chemical elements in air and water, improved properties as a biocide.
d) Photovoltaic cells—improved light/electrical energy conversion efficiency.
e) Surfaces—self-cleaning effect in organic matter disposal.

Real Particle Density

The relation between experimental density and theoretical density is an indication of the internal porosity degree of the particle. This property is particularly important in applications requiring the manufacture of dense ceramic articles from nanopowders because the internal porosity can not be eliminated during the sintering stage.

DETAILED DESCRIPTION OF THE INVENTION

1. Process for the Manufacture of Nanometric Materials

The process for the manufacture of nanometric materials starts with the selection of the mixture reagents (emulsion, precursors, surfactants, etc.) according to the desired ceramic compound. Thereafter one proceeds to the adjustment of the final composition by calculating the detonation reaction temperature.

1.1. Determining the Emulsion Detonation Temperature

The calculation of the detonation temperature at the point C,J is effected from the composition and initial density of the emulsion by means of computational programs using the state equation and numerical methods.

1.2. Preparing the Initiator Emulsion (1)

The preparation of emulsion 1 starts with the dissolution of NH4NO3 in demineralised water inside a stirred and heated tank, thereby providing an ammonium nitrate solution—internal phase. Then one proceeds to the internal phase emulsification with the oil (external phase) inside an emulsifier device suitable to the viscosity range, thereby affording an emulsified matrix. Finally, into a tank with relatively low stirring speed about 0.5% of plastic microspheres are added, in order to sensitize the emulsion to detonator or other type of actuation.

1.3. Preparing the Emulsion 2 (Emulsion with the Various Precursors)

This emulsion is composed by an aqueous internal phase and an insoluble external phase. The external phase of the emulsion must be usually comprised between 2 and 20% of the total composition.

1.3.1. To prepare the internal phase, the precursors are dissolved in water according to the composition previously selected. The solution is then heated at a temperature (35-105° C.) higher than the crystallization point of the several reagents.

The amount of water of the solution should be comprised between 5-60% of the total composition.

1.3.2. The preparation of the external phase of the emulsion is effected by mixing the hydrocarbons or organic materials that compose it with a surfactant suitable to the pH values of the mixture. The mixture is heated at a temperature between 35-85° C.

The surfactant should correspond to 1 to 2% weight of the emulsion obtained.

1.3.3. The emulsification of both phases into an emulsified matrix occurs in an emulsifier device appropriate to the viscosity range, thereby affording an emulsified matrix. Then a refining stage at about 60-150 psi is conducted by passing the emulsion through static mixers.

1.3.4. Then an organic sensitizer (0.2 to 2%), such as expanded polystyrene or contaminant-free plastic spheres, is added.

1.3.5. Finally, solid state metal compounds or metal alloys can be added, being externally but homogeneously mixed with the emulsion prepared according to the points 1.3 to 1.3.4.

1.4. Detonation Conditions

For the detonation of the W/O emulsion, emulsion (2) is placed inside a 35 mm cylindrical cartridge preceded by the initiator emulsion (1). The detonation is then initiated by means of an electrical detonator inserted in emulsion 1.

1.5. Collecting the Material

Powders are dragged by the gases originating in the detonation reaction into an expansion chamber, where they are wet collected to avoid accumulating dusts in the air. Then they are wet sieved, dried at a temperature always below 70° C., and finally deagglomerated and bagged.

EXAMPLES

In all the examples presented herein there is a first emulsion, referred to as emulsion 1 or initiator emulsion, whose function is to stabilize the detonation reaction and which precedes emulsion 2 containing the composition with the different precursors. In all the tests that were conducted, 50 g of emulsion 1 were placed inside each cartridge, and these were subsequently filled with about 200 g of emulsion 2.

Preparation of emulsion 1 or initiator emulsion:
Oil (mineral oil (80%)+emulsifying agent (20%)): 4.975%
NH4NO3: 84.575%
$H_2O$: 9.95%
Plastic sensitizer: 0.5%

The preparation of emulsion 1 starts with the dissolution of NH4NO3 in demineralised water inside a stirred and heated tank, thereby providing an ammonium nitrate solution—internal phase. Then one proceeds to the internal phase emulsification with the oil (external phase) inside an emulsifier device suitable to the viscosity range, thereby obtaining an emulsified matrix. Finally, into a tank with relatively low stirring speed about 0.5% of plastic microspheres are added, in order to sensitize the emulsion to detonator or other type of initiation.

Example 1

Preparation of Magnetite (Fe3O4), Inverse Spinel Structure 1. 200 g of an emulsion (2) were prepared in the following way and with the following components/amounts:
Oil (mineral oil (80%)+emulsifying agent (20%)): 4.5%;
NH4NO3: 47.5%;
Fe(NO3)3.6H2O: 47.5%
Plastic sensitizer: 0.5%

Preparation of Emulsion 2:
Iron nitrate is heated at a temperature slightly above the crystallisation point until its complete solubilization. Ammonium nitrate is added and the system is stirred, affording a completely clear solution (crystal-free solution). In a stirred beaker the mineral oil is mixed with the emulsifying agent, thereby providing a composition named oil—external phase.

In an emulsifier device suitable to the viscosity range, the oil is emulsified with the nitrate solution in order to provide a stable emulsion. In a stirred tank, about 0.5% of plastic microspheres are finally added to the emulsion thus obtained.

2. The characteristics of this emulsion (2) at the point (C,J) are the following:
Emulsion detonation rate: 5440 m/s
Detonation pressure (Point CJ): 87.3 kbar
Detonation temperature (Point CJ): 1406° C.

3. Emulsion 2 was placed inside a 35 mm cylindrical cartridge preceded by the initiator emulsion (1), being actuated by means of an electrical detonator.

4. As can be seen by the detonation characteristics presented in point 2, the reaction temperature is relatively low, affording very small primary particles of about 25 nm, and the very fast cooling rate leads to a very fast particle solidification, preventing their growth. A summary of the main characteristics of the magnetite thus obtained is presented in table 1.

Example 2

Preparation of Aluminium Nitride (AlN)

1. 200 g of an emulsion (2) were prepared in the following way and with the following components/amounts:
Oil (mineral oil (80%)+emulsifying agent (20%)): 3.5%;
Hydrazine: 70%;
Water: 6.0%
Granulated aluminium (>100 microns and <600 microns): 20%
Plastic sensitizer: 0.5%

Preparation of Emulsion 2:
Hydrazine is diluted in water to produce a homogeneous solution. The mineral oil is mixed with the emulsifying agent in a stirred beaker. In an emulsifier device suitable to the viscosity range, the oil is emulsified with the hydrazine solution, thereby providing a stable emulsion. In a stirred tank, about 0.5% of plastic microspheres are then added to the emulsion thus obtained and finally the granulated aluminium is mixed with very slow stirring, to prevent metal friction.

2. The characteristics of this emulsion (2) at the point (C,J) are the following:
Emulsion detonation rate: 8108 m/s
Detonation pressure (Point CJ): 163.6 kbar
Detonation temperature (Point CJ): 1924° C.

3. Emulsion 2 was placed inside a 35 mm cylindrical cartridge preceded by the initiator emulsion (1), being actuated by means of an electrical detonator.

4. The ingredients presented in point 1 show that water is the only one that contains oxygen, but since it is present in the global composition at only 6%, the conditions are set for the natural formation of aluminium nitride instead aluminium oxide. Both the crystallite size and the primary particle size are very small, a few dozen nanometers, because the very fast particle cooling rate strikingly decreases the possibility for them to grow and stops the crystallite growth. The high pressure at the point C,J explains the fast solidification rate of the primary particles, preventing the formation of necks among them during the collision period. A summary of the main characteristics of the aluminium nitrate obtained according to the previous description is presented in table 1.

Example 3

Preparation of the Magnesium Aluminate (MgAl2O4) Spinel 1. 200 g of an emulsion (2) were prepared in the following way and with the following components/amounts:
Oil (mineral oil (80%)+emulsifying agent (20%)): 4.9%;
Aluminium nitrate: 46.6%;
Amonium nitrate (NH4NO3): 46.6%
Granulated magnesium (>100 microns and <600 microns): 1.5%
Plastic sensitizer: 0.4%

Preparation of Emulsion 2:
Aluminium nitrate is heated at a temperature slightly above the melting point until its complete solubilization. Ammonium nitrate is added and the system is stirred, providing a completely clear solution. In a stirred beaker the mineral oil is mixed with the emulsifying agent, thereby affording a composition named oil—external phase.

In an emulsifier device suitable to the viscosity range, the oil is emulsified with the nitrate solution, thereby providing a stable emulsion. In a slow-stirred tank, about 0.5% of plastic microspheres are added to the emulsion thus obtained and the granulated magnesium is finally mixed also with very slow stirring, to prevent metal friction.

2. The characteristics of this emulsion (2) at the point (C,J) are the following:
Emulsion detonation rate: 5514 m/s
Detonation pressure (Point CJ): 97.8 kbar
Detonation temperature (Point CJ): 1321° C.

3. Emulsion 2 was placed inside a 35 mm cylindrical cartridge preceded by the initiator emulsion (1), being actuated by means of an electrical detonator.

4. As can be seen by the X-Ray diffraction conducted on the collected sample, the major crystalline phase is the magnesium aluminate spinel. The sample has crystalline structure and exhibits a crystallite size about 18 nanometers.

The average primary particle size is about 50 nm as observed with SEM. The very fast cooling rate and the fact that the reaction temperature is lower than 2000° C. explain the primary particle and crystallite sizes, the temperature is not sufficiently favourable to crystallite growth and the fast solidification rate prevents particles from gluing during collisions, thereby preventing the formation of larger-sized particles.

As previously mentioned, the major crystalline phase is magnesium aluminate and this result is explained by the high homogeneity level of the mixture of precursors in the emulsion, thereby providing a better combination and more stable formation of the crystalline phase during the detonation process.

A summary of the main characteristics of the magnesium aluminate spinel obtained according to the previous description is presented in table 1.

TABLE 1

Characteristics of the powders obtained according to the conditions of examples 1, 2, and 3.

| Material | Particle Size (nm) | BET (m2/g) | Crystallite Size (nm) | Purity level (%) | Crystalline Phase (%) | Real Density (g/cm3) |
|---|---|---|---|---|---|---|
| Fe3O4 | 25 | 50 | 10 | 99.98 | >91 | 5.10 |
| AlN | 50 | 40 | 18 | 99.92 | >95 | 3.29 |
| MgAl2O4 | 42 | 40 | 15 | 99.95 | >99 | 3.58 |

The invention claimed is:

1. Process for the synthesis of nanometric-sized ceramic materials, wherein the process is carried out by detonating two water-in-oil (W/O) emulsions, a first emulsion and a second emulsion, wherein the second emulsion contains a set of precursors of ceramic materials and presents a detonation regime at temperatures in the point C,J (Chapman, Jouguet) lower than the ceramic nanomaterial melting point, determined from the composition and density of the emulsion by means of the state equation and numerical methods, and wherein one of the first emulsion and the second emulsion has at least one material not present in the other of the first emulsion and the second emulsion.

2. The process according to claim 1, wherein the precursors of the second emulsion comprise one or more of oxidizing agents soluble in the internal aqueous phase, fuels soluble in the internal aqueous phase, fuels miscible with the external phase, and still solid precursors.

3. The process according to claim 1, wherein the definition of the composition of the second emulsion comprises the following stages:
 a) defining the stoichiometry of the precursors in the mixture;
 b) adjusting the detonation temperature.

4. The process according to claim 1, wherein the pH of the second emulsion is acidic and lower than 5.

5. The process according to claim 1, wherein the first emulsion has the following composition:
 a. Ammonium Nitrate: 70 to 90%;
 b. Water: 5 to 20%;
 c. Oil: 3 to 10%;
 d. Emulsifying Agent: 0.5 to 2.5%;
 e. Organic sensitizer: 0.2 to 1%.

6. The process according to claim 1, wherein each of the first and second emulsions exhibit one or more of a spherical configuration, cylindrical configuration, plane faces configuration, and annular configuration.

7. The process according to claim 1, wherein the detonation is initiated in the first emulsion.

8. The process according to claim 1, wherein the ceramic materials exhibit:
 a. homogeneous distribution of primary particles between 15 and 100 nm;
 b. crystalline phase homogeneity, in each individual particle, higher than 90%;
 c. crystallite size lower than 50 nm;
 d. true density higher than 98% of the theoretical density;
 e. surface area by mass unit between 5 and 500 m2/g;
 f. a purity level higher than 99.99%.

9. The process according to claim 1, wherein the second emulsion further comprises as precursors oxidizing agents soluble in the internal aqueous phase, fuels soluble in the internal aqueous phase, fuels miscible with the external phase, and still solid precursors, and wherein the second emulsion has an internal phase having a pH lower than 3, a density comprised between 0.7 and 1.7 g/cm3, and a detonation regime with a reaction rate higher than 4000 m/s for a detonation temperature lower than a melting point of the ceramic nanomaterial.

10. The process according to claim 2, wherein the pH of the second emulsion is acidic and lower than 5.

11. The process according to claim 3, wherein the pH of the second emulsion is acidic and lower than 5.

12. The process according to claim 2, wherein the ceramic materials exhibit:
 a. homogeneous distribution of primary particles between 15 and 100 nm;
 b. crystalline phase homogeneity, in each individual particle, higher than 90%;
 c. crystallite size lower than 50 nm;
 d. true density higher than 98% of the theoretical density;
 e. surface area by mass unit between 5 and 500 m2/g;
 f. a purity level higher than 99.99%.

13. The process according to claim 3, wherein the ceramic materials exhibit:
 a. homogeneous distribution of primary particles between 15 and 100 nm;
 b. crystalline phase homogeneity, in each individual particle, higher than 90%;
 c. crystallite size lower than 50 nm;
 d. true density higher than 98% of the theoretical density;
 e. surface area by mass unit between 5 and 500 m2/g;
 f. a purity level higher than 99.99%.

14. The process according to claim 5, wherein the ceramic materials exhibit:
 a. homogeneous distribution of primary particles between 15 and 100 nm;
 b. crystalline phase homogeneity, in each individual particle, higher than 90%;
 c. crystallite size lower than 50 nm;
 d. true density higher than 98% of the theoretical density;
 e. surface area by mass unit between 5 and 500 m2/g;
 f. a purity level higher than 99.99%.

15. A process for the synthesis of nanometric-sized ceramic materials, wherein the process is carried out by detonating two water-in-oil (W/O) emulsions, a first emulsion and a second emulsion, wherein the second emulsion contains a set of precursors of ceramic materials and presents a detonation regime at temperatures in the point C,J (Chapman, Jouguet) lower than the ceramic nanomaterial melting point, determined from the composition and density of the emulsion by means of the state equation and numerical methods, wherein the first emulsion has the following composition:
- a. Ammonium Nitrate: 70 to 90%;
- b. Water: 5 to 20%;
- c. Oil: 3 to 10%;
- d. Emulsifying Agent: 0.5 to 2.5%;
- e. Organic sensitizer: 0.2 to 1%.

16. The process according to claim 15, wherein the ceramic materials exhibit:
- a. homogeneous distribution of primary particles between 15 and 100 nm;
- b. crystalline phase homogeneity, in each individual particle, higher than 90%;
- c. crystallite size lower than 50 nm;
- d. true density higher than 98% of the theoretical density;
- e. surface area by mass unit between 5 and 500 m2/g;
- f. a purity level higher than 99.99%.

* * * * *